(12) United States Patent
Yang et al.

(10) Patent No.: US 10,431,010 B2
(45) Date of Patent: Oct. 1, 2019

(54) SYSTEMS AND METHODS FOR VIRTUAL APPLICATION OF COSMETIC EFFECTS TO A REMOTE USER

(71) Applicant: Perfect Corp., New Taipei (TW)

(72) Inventors: Chia-Che Yang, New Taipei (TW); Po-Ho Wu, Tainan (TW)

(73) Assignee: PERFECT CORP., New Taipei (TW)

(*) Notice: Subject to any disclaimer, the term of this patent is extended or adjusted under 35 U.S.C. 154(b) by 0 days.

(21) Appl. No.: 15/983,304

(22) Filed: May 18, 2018

(65) Prior Publication Data
US 2019/0251754 A1  Aug. 15, 2019

Related U.S. Application Data

(60) Provisional application No. 62/628,344, filed on Feb. 9, 2018.

(51) Int. Cl.
G06T 19/20 (2011.01)
G06K 9/00 (2006.01)
H04N 5/232 (2006.01)

(52) U.S. Cl.
CPC .......... G06T 19/20 (2013.01); G06K 9/00281 (2013.01); G06T 2200/24 (2013.01);
(Continued)

(58) Field of Classification Search
None
See application file for complete search history.

(56) References Cited

U.S. PATENT DOCUMENTS 9,058,765 B1 * 6/2015 Mallick ................. G06F 3/0482
2003/0065578 A1  4/2003 Peyrelevade et al.
(Continued)

FOREIGN PATENT DOCUMENTS

EP    1134701 A2    9/2001
JP    2002 092132 A 3/2002
(Continued)

OTHER PUBLICATIONS

Hartmans, Avery. "I learned how to apply makeup using a futuristic new feature on Sephora's app—here's what happened" Business Insider India. Mar. 18, 2017.
(Continued)

Primary Examiner — Zhengxi Liu
(74) Attorney, Agent, or Firm — McClure, Qualey & Rodack, LLP

(57) ABSTRACT

A makeup application device utilized by a makeup professional obtains a makeup consultation request from a user of a client device and obtains at least one digital image of a facial region of the user from the client device. A three-dimensional (3D) facial model is generated based on the at least one digital image, and user input is obtained from the makeup professional for applying virtual cosmetic effects to the 3D facial model. The makeup application device generates a command based on the user input from the makeup professional for applying a virtual cosmetic effect and transmits the command to the client device. The command causes a virtual cosmetic effect to be applied to the at least one digital image of the facial region of the user and displaying the at least one digital image.

14 Claims, 8 Drawing Sheets

(52) U.S. Cl.
CPC ............ *G06T 2219/2004* (2013.01); *G06T 2219/2016* (2013.01); *H04N 5/23222* (2013.01)

(56) References Cited

U.S. PATENT DOCUMENTS

| | | | |
|---|---|---|---|
| 2011/0300196 A1* | 12/2011 | Mohammadi | A45D 44/002 424/401 |
| 2012/0158184 A1 | 6/2012 | Ma et al. | |
| 2014/0032331 A1 | 1/2014 | Blanch et al. | |
| 2016/0042557 A1 | 2/2016 | Lin et al. | |
| 2016/0128450 A1 | 5/2016 | Saito et al. | |
| 2016/0364201 A1* | 12/2016 | Beveridge | G06F 3/1454 |
| 2017/0024589 A1 | 1/2017 | Schumacher et al. | |
| 2018/0278879 A1* | 9/2018 | Saban | G06T 7/11 |

FOREIGN PATENT DOCUMENTS

| | | |
|---|---|---|
| KR | 101578422 B1 | 12/2015 |
| WO | 2011/085727 A1 | 7/2011 |

OTHER PUBLICATIONS

Wu, Sarah. "Wear Realistic Virtual Makeup with Meitu's Makeup-Plus x Lisa Eldridge" Teen Vogue. Nov. 17, 2016.
European Search report issued in corresponding European patent application No. 18199053.2 dated Apr. 26, 2019.

\* cited by examiner

SYSTEMS AND METHODS FOR VIRTUAL APPLICATION OF COSMETIC EFFECTS TO A REMOTE USER

CROSS-REFERENCE TO RELATED APPLICATION

This application claims priority to, and the benefit of, U.S. Provisional patent application entitled, "Easy way to put on makeup on a model and applied to a remote user's face at the same time," having Ser. No. 62/628,344, filed on Feb. 9, 2018, which is incorporated by reference in its entirety.

TECHNICAL FIELD

The present disclosure generally relates to media editing and more particularly, to systems and methods for performing virtual application of cosmetics to a remote user.

BACKGROUND

Individuals invest a substantial amount of money in makeup tools and accessories. However, it can be challenging to achieve the same results as a makeup professional even with the aid of conventional self-help guides.

SUMMARY

In accordance with one embodiment, a makeup application device utilized by a makeup professional obtains a makeup consultation request from a user of a client device and obtains at least one digital image of a facial region of the user from the client device. A three-dimensional (3D) facial model is generated based on the at least one digital image, and user input is obtained from the makeup professional for applying virtual cosmetic effects to the 3D facial model. The makeup application device generates a command based on the user input from the makeup professional for applying a virtual cosmetic effect and transmits the command to the client device. The command causes a virtual cosmetic effect to be applied to the at least one digital image of the facial region of the user and displaying the at least one digital image Another embodiment is a system that comprises a memory storing instructions and a processor coupled to the memory. The processor is configured by the instructions to obtain a makeup consultation request from a user of a client device and obtain at least one digital image of a facial region of the user from the client device. The processor is further configured to generate a three-dimensional (3D) facial model based on the at least one digital image and obtain user input from the makeup professional for applying virtual cosmetic effects to the 3D facial model. The processor is further configured to generate a command based on the user input from the makeup professional for applying a virtual cosmetic effect and transmit the command to the client device, the command causing a virtual cosmetic effect to be applied to the at least one digital image of the facial region of the user and displaying the at least one digital image.

Another embodiment is a non-transitory computer-readable storage medium storing instructions to be implemented by a computing device having a processor, wherein the instructions, when executed by the processor, cause the computing device to obtain a makeup consultation request from a user of a client device and obtain at least one digital image of a facial region of the user from the client device. The processor is further configured to generate a three-dimensional (3D) facial model based on the at least one digital image and obtain user input from the makeup professional for applying virtual cosmetic effects to the 3D facial model. The processor is further configured to generate a command based on the user input from the makeup professional for applying a virtual cosmetic effect and transmit the command to the client device, the command causing a virtual cosmetic effect to be applied to the at least one digital image of the facial region of the user and displaying the at least one digital image Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for facilitating the application of virtual makeup by implementing an improved platform for conducting makeup consultation sessions between a makeup application device utilized by a makeup professional and a client device utilized by a user seeking the consultation. As described in more detail below, the system includes a makeup application device that receives a makeup consultation request initiated by a user at a client device. One or more digital images of the facial region of the user are obtained and a three-dimensional (3D) model is generated by the makeup application device. The makeup professional applies cosmetic effects to facial features of the 3D model, whereby commands are generated based on the actions of the makeup professional and sent to the client device. The client device receives the commands, and the user is able to utilize the client device to view the step-by-step application of cosmetic effects to the one or more digital images of the user.

Figure 1:
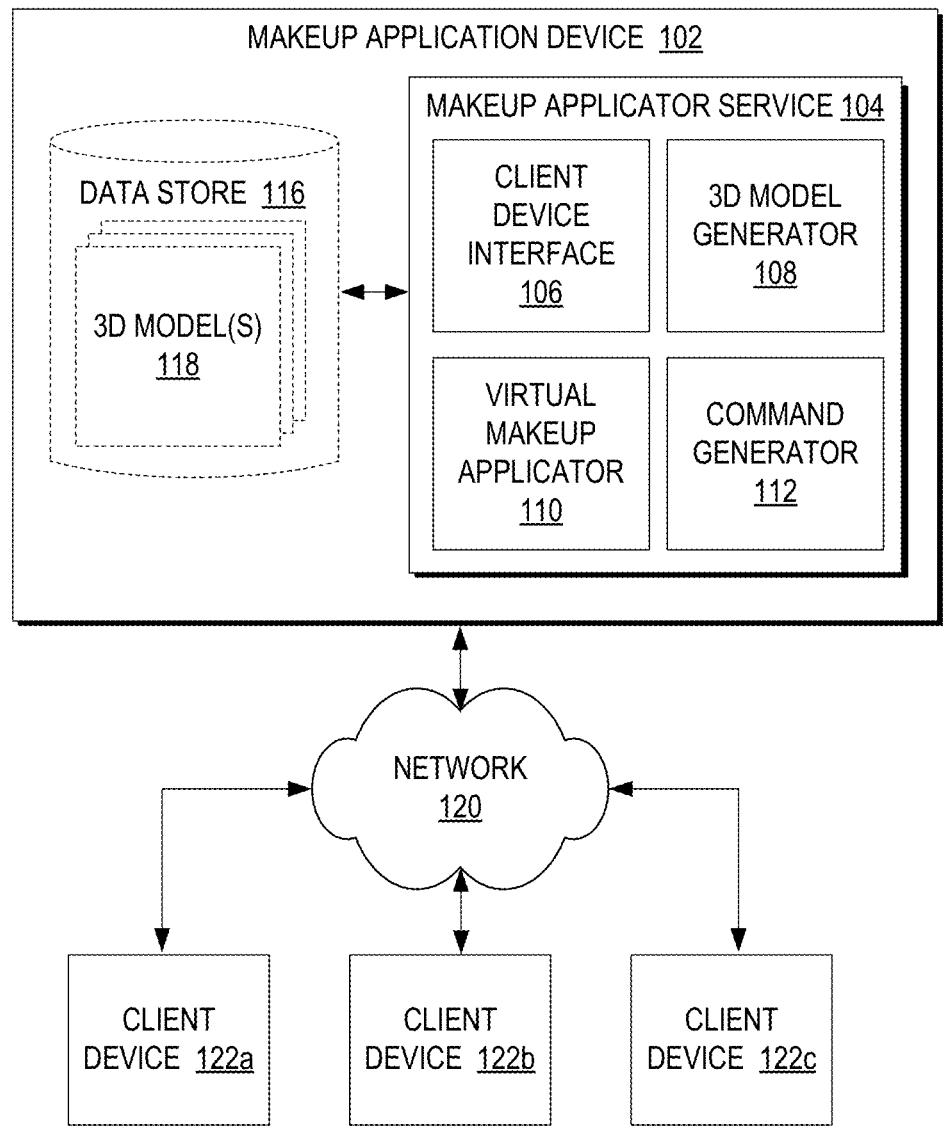
FIG. 1 is a block diagram of a system for implementing a makeup consultation platform in accordance with various embodiments of the present disclosure.

A description of a system for implementing a makeup consultation platform is now described followed by a discussion of the operation of the components within the system. FIG. 1 is a block diagram of a makeup application device 102 in which the techniques for virtual application of cosmetic effects and makeup consultation disclosed herein may be implemented. The makeup application device 102 may be embodied as a computing device such as, but not limited to, a smartphone, a tablet computing device, a laptop computer, and so on. The client devices 122a, 122b, 122c may be similarly embodied as computing devices such as, but not limited to, smartphones, tablet computing devices, laptop computers, and so on. Each of the client devices 122a, 122b, 122c may be equipped with digital content recording capabilities (e.g., front-facing camera).

The makeup application device 102 is coupled to the client devices 122a, 122b, 122c via a network 120 such as, for example, the Internet, intranets, extranets, wide area networks (WANs), local area networks (LANs), wired networks, wireless networks, or other suitable networks, etc., or any combination of two or more such networks. The makeup application device 102 is communicatively coupled to the client devices 122a, 122b, 122c for conducting makeup consultations, where the client devices 122a, 122b, 122c uploads digital images of respective users to the makeup application device 102.

As one of ordinary skill will appreciate, the digital images may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital images may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

A makeup applicator service 104 executes on a processor of the makeup application device 102 and includes a client device interface 106, a 3D model generator 108, a virtual makeup applicator 110, and a command generator 112. The client device interface 106 is configured to obtain a makeup consultation request from a user of a client device 122. The client device interface 106 is further configured to obtain one or more digital images of a facial region of the user from the client device 122.

The 3D model generator 108 generates a 3D facial model using the one or more digital images obtained from the client device 122. For some embodiments, this involves retrieving a default 3D model 118 from a data store 116 and modifying a size and location for predetermined facial features on the default 3D model 118 based on a size and location of corresponding facial features on the one or more digital images of the facial region of the user in order to customize the 3D model to the user.

The virtual makeup applicator 110 obtains user input from the makeup professional for applying virtual cosmetic effects to the 3D facial model. The command generator 112 is configured to generate a command based on the user input from the makeup professional for applying a virtual cosmetic effect. The command generator 112 is further configured to transmit the command to the client device 122, where the command causes a virtual cosmetic effect to be applied to the one or more digital images of the facial region of the user. Application of the virtual cosmetic effect to the one or more digital images is displayed to the user on the client device 122.

Figure 2:
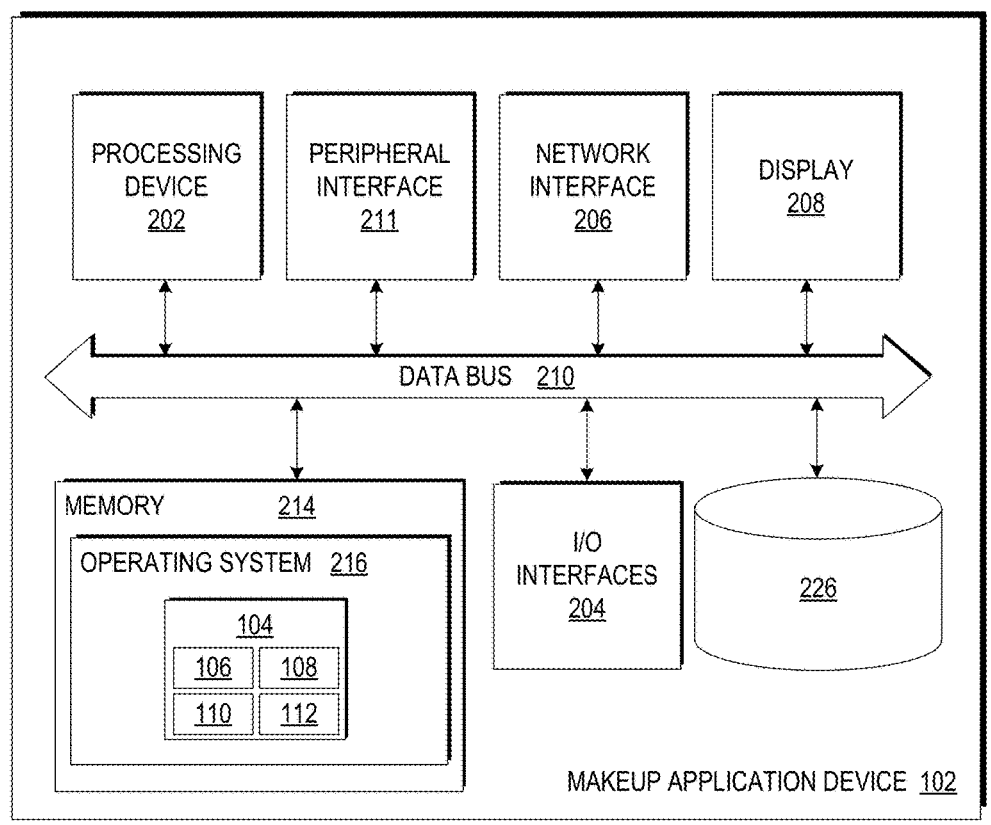
FIG. 2 is a schematic diagram of the makeup application device of FIG. 1 in accordance with various embodiments of the present disclosure.

FIG. 2 illustrates a schematic block diagram of the makeup application device 102 in FIG. 1. The makeup application device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the makeup application device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the makeup application device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the makeup application device 102 depicted in FIG. 1. In accordance with such embodiments, the components are stored in memory 214 and executed by the processing device 202, thereby causing the processing device 202 to perform the operations/functions for implementing the features disclosed herein. One of ordinary skill in the art will appreciate that the memory 214 can, and typically will, comprise other components which have been omitted for purposes of brevity. For some embodiments, the components in the makeup application device 102 may be implemented by hardware and/or software.

Input/output interfaces 204 provide any number of interfaces for the input and output of data. For example, where the makeup application device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
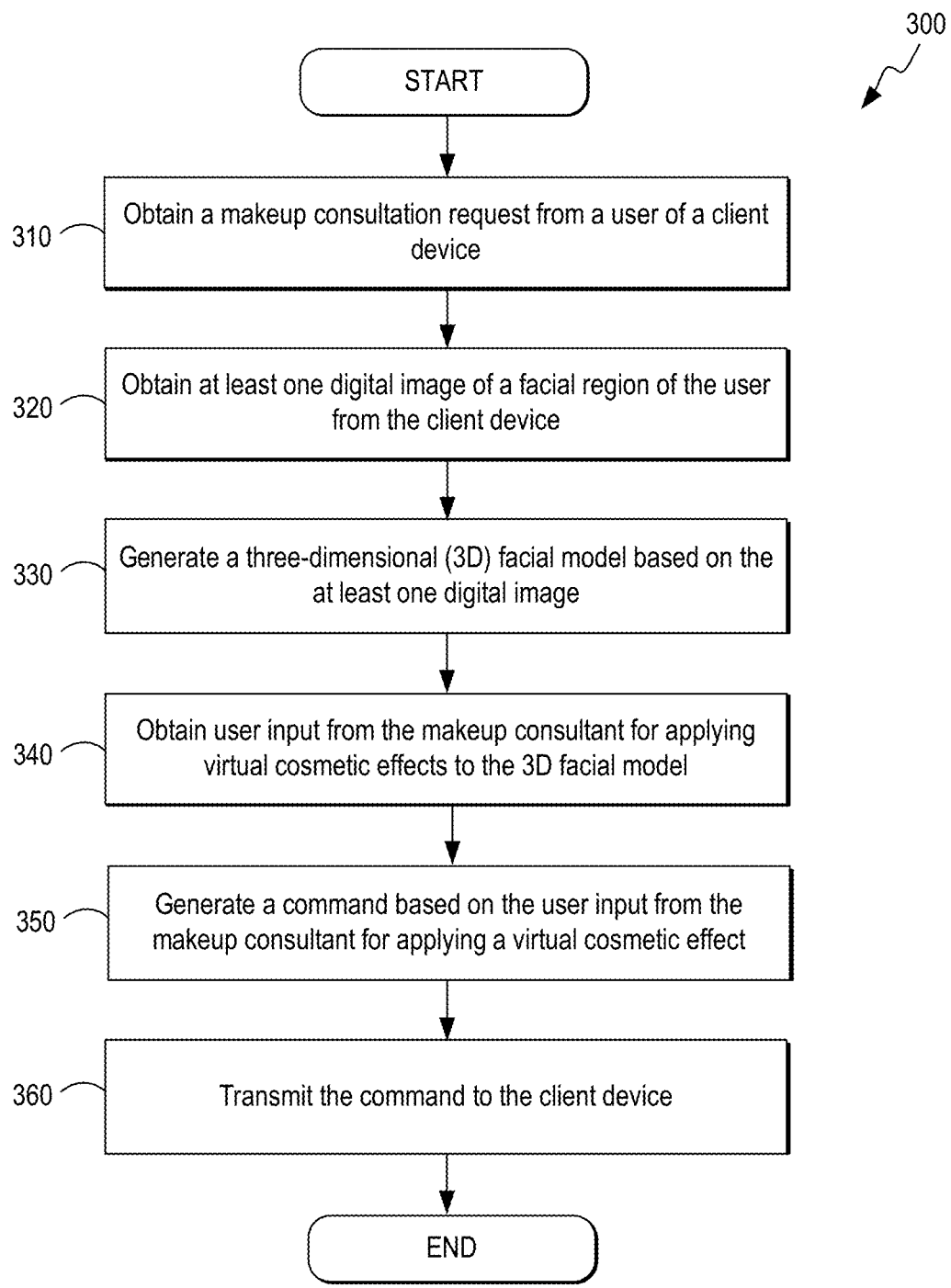
FIG. 3 is a top-level flowchart illustrating examples of functionality implemented as portions of the makeup application device of FIG. 1 according to various embodiments of the present disclosure.

Reference is made to FIG. 3, which is a flowchart 300 in accordance with various embodiments for implementing a makeup consultation platform using the makeup application device 102 of FIG. 1. It is understood that the flowchart 300 of FIG. 3 provides merely an example of the different types of functional arrangements that may be employed to implement the operation of the various components of the makeup application device 102. As an alternative, the flowchart 300 of FIG. 3 may be viewed as depicting an example of steps of a method implemented in the makeup application device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the makeup application device 102 obtains a makeup consultation request from a user of a client device. At block 320, the makeup application device 102 obtains at least one digital image of a facial region of the user from the client device. For some embodiments, this involves causing the client device 122 to prompt the user to face a front facing camera of the client device 122 at a plurality of angles and capturing a digital image at each angle.

At block 330, the makeup application device 102 generates a 3D facial model based on the at least one digital image. For some embodiments, this involves retrieving a default 3D model and modifying a size and location for predetermined facial features on the default 3D model based on a size and location of corresponding facial features on the at least one digital image of the facial region of the user.

At block 340, the makeup application device 102 obtains user input from the makeup professional for applying virtual cosmetic effects to the 3D facial model. For some embodiments, obtaining user input from the makeup professional for applying virtual cosmetic effects to the 3D facial model includes obtaining an adjustment to an orientation of the 3D facial model along one or more axes from the makeup professional and displaying the 3D facial model according to the adjusted orientation. For example, the makeup professional may utilize a user interface displayed on the makeup application device 102 to perform rotating and panning operations on the 3D facial model to facilitate application of virtual cosmetic effects. The makeup application device 102 also obtains a location on the 3D facial model and applies a cosmetic effect to the location on the 3D facial model.

For some embodiments, obtaining user input from the makeup professional for applying virtual cosmetic effects to the 3D facial model includes obtaining a zoom level from the makeup professional and displaying the 3D facial model according to the zoom level. For some embodiments, the makeup application device 102 obtains an enable input from the makeup professional, where the enable input specifies whether to allow the client device to display application of the virtual cosmetic effect at the zoom level. That is, the makeup professional controls whether the user of the client device 122 views application of cosmetic effects according to the zoom level specified by the makeup professional. The makeup application device 102 obtains a location on the 3D facial model and applies a cosmetic effect to the location on the 3D facial model.

At block 350, the makeup application device 102 generates a command based on the user input from the makeup professional for applying a virtual cosmetic effect. At block 360, the makeup application device 102 transmits the command to the client device, the command causing a virtual cosmetic effect to be applied to the at least one digital image of the facial region of the user and display the at least one digital image. For some embodiments, displaying the at least one digital image comprises displaying a live video feed of the facial region of the user.

For some embodiments, the makeup application device 102 transmits the command to the client device whenever user input is obtained from the makeup professional, where the command comprises locations of feature points where the virtual cosmetic effects are applied to the 3D facial model. The client device 122 (FIG. 1) maps the feature points where the virtual cosmetic effects are applied to the 3D facial model to feature points on the facial region of the user. The client device 122 then applies the same virtual cosmetic effects to the facial region of the user based on the mapped feature points. For some embodiments, the makeup application device 102 stores a sequence in which the user input is obtained from the makeup professional for applying virtual cosmetic effects to the 3D facial model.

For some embodiments, the command causes the client device to display application of the virtual cosmetic effect to the at least one digital image of the facial region of the user according to the adjusted orientation obtained from the makeup professional. The command may also cause the client device to display application of the virtual cosmetic effect to the at least one digital image of the facial region of the user at the zoom level obtained from the makeup professional according to the enable input. Thereafter, the process in FIG. 3 ends.

Figure 4:
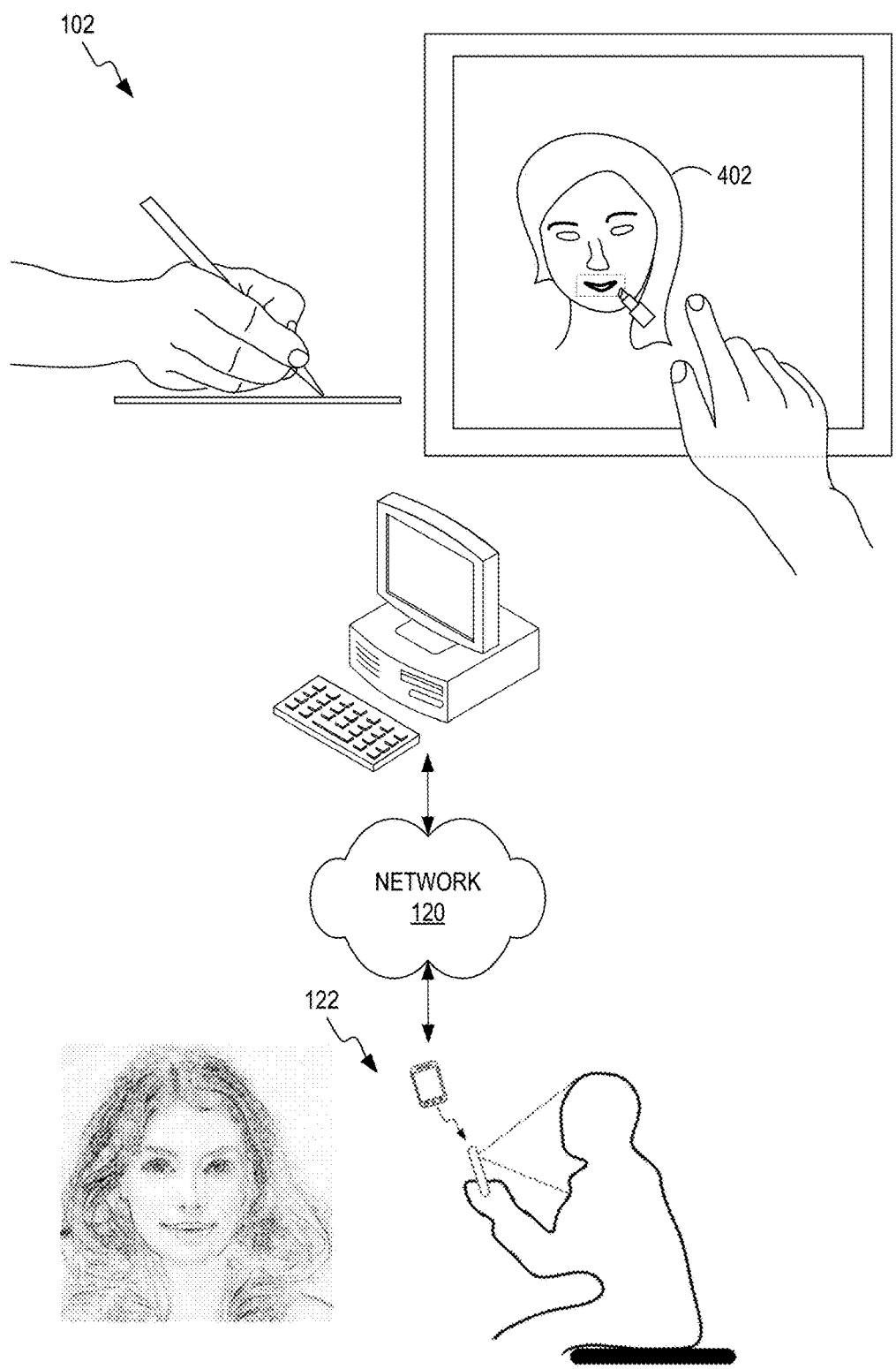
FIG. 4 illustrates a makeup consultation session utilizing the makeup application device and the client device in FIG. 1 according to various embodiments of the present disclosure.

Having described the basic framework of a system for providing makeup consultation, reference is made to the following figures, which further illustrate various features disclosed above. FIG. 4 illustrates a makeup consultation session utilizing the makeup application device 102 and the client device 122 in FIG. 1 according to various embodiments of the present disclosure. As discussed above, the makeup application device 102 may be embodied as a computing device such as, but not limited to, a smartphone, a tablet computing device, a laptop computer, and so on. As shown, a makeup professional may utilize a pen/stylus in conjunction with a trackpad or tablet coupled to the makeup application device 102 to precisely perform virtual application of cosmetic effects onto a 3D model 402 of the user of the client device 122. The makeup professional may also utilize a touchscreen interface of the makeup application device 102 for performing virtual application of cosmetic effects.

As discussed above, the makeup application device 102 generates a command based on the actions of the makeup professional for applying a virtual cosmetic effect. In the example shown in FIG. 4, the makeup professional applies a lipstick effect to the 3D model 402. A corresponding command is generated and transmitted via the network 120 to the client device 122. The command causes the client device 122 to display virtual application of a lipstick effect onto a digital image of the user of the client device 122. For some embodiments, the makeup professional can apply a series of cosmetic effects (e.g., lipstick effect, eyeliner effect, blush effect, eyelash effect, eyebrow effect, eyeshadow effect, face foundation effect, hair color effect) and control when a command is generated and transmitted to the client device 122. This may comprise, for example, manipulating a control on a user interface displayed on the on the makeup application device 102.

Figure 5:
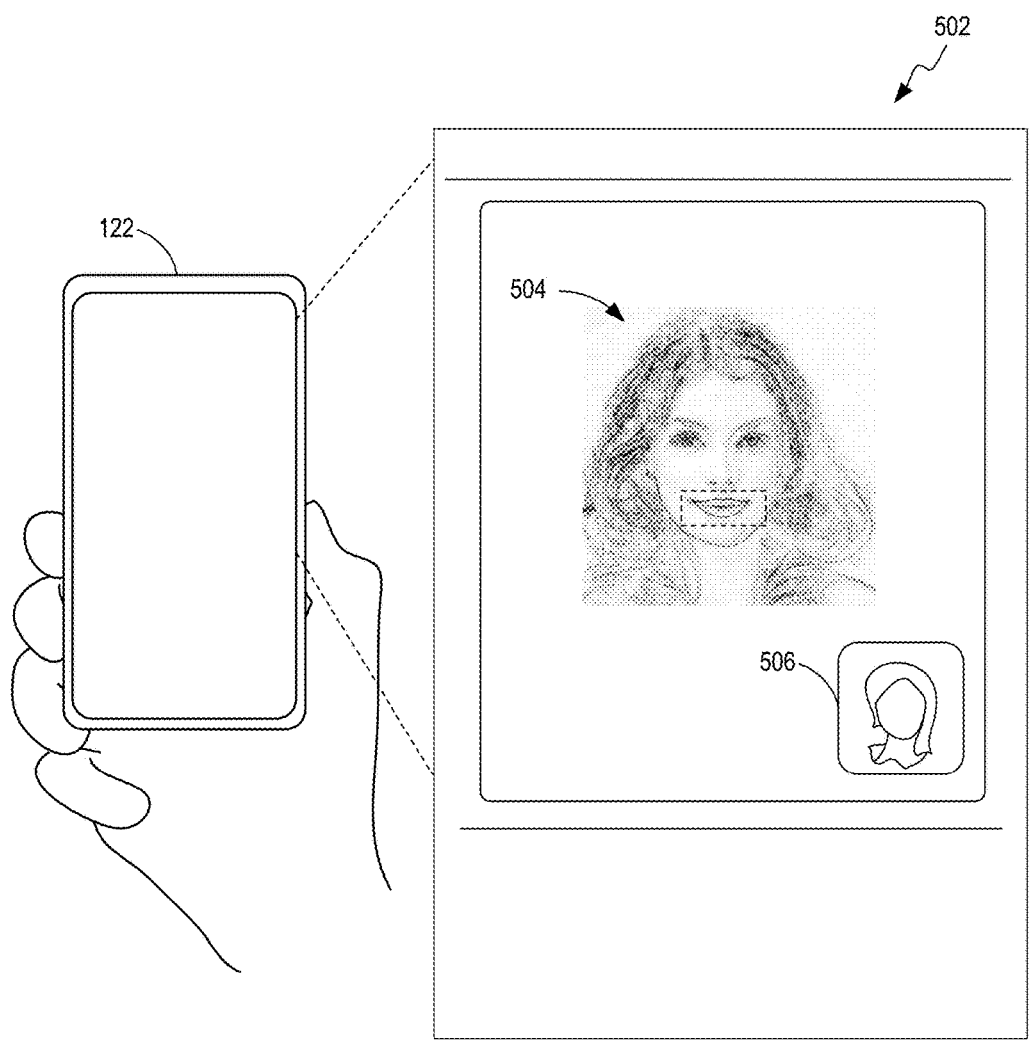
FIG. 5 illustrates an example user interface provided on a display of a client device in FIG. 1 according to various embodiments of the present disclosure.

FIG. 5 illustrates an example user interface 502 provided on a display of a client device 122 in FIG. 1 according to various embodiments of the present disclosure. Referring back to the example above, a lipstick effect is applied by the makeup professional. This causes a corresponding lipstick effect to be applied to a digital image 504 of the user. In some implementations, a live video feed of the user is displayed on the client device 122 while makeup effects are applied by the makeup professional, thereby providing a virtual mirror effect. For some embodiments, the user of the client device 122 can view the makeup professional applying the makeup effect while simultaneously viewing the makeup effect being applied on the facial region of the user using a picture-in-picture (PIP) layout, a side-by-side layout, and so on. In the example shown in FIG. 5, a PIP window 506 is included in the user interface 502, where the PIP window 506 depicts an image of the makeup professional.

Figure 6:
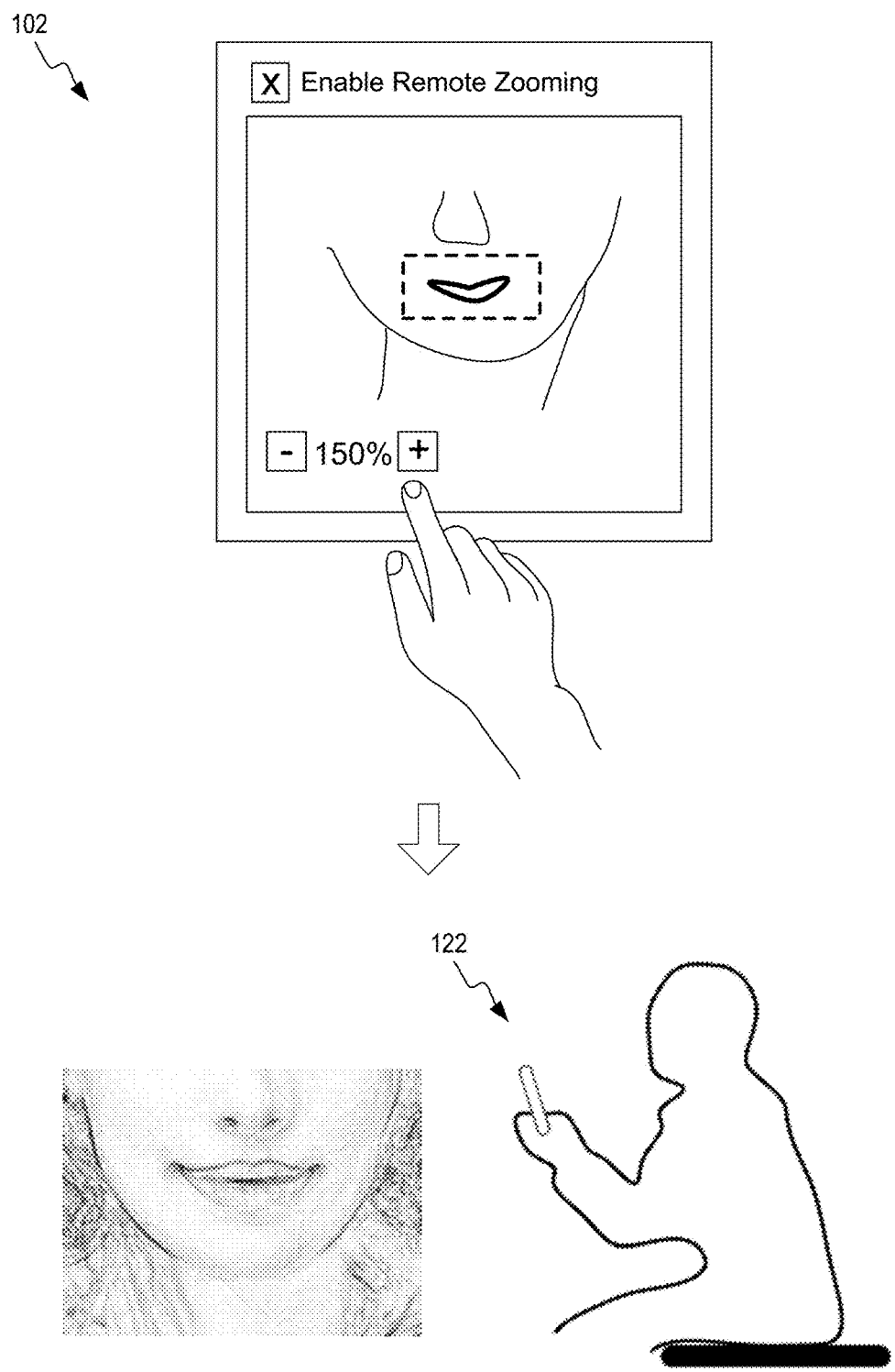
FIG. 6 illustrates a zooming operation performed on the makeup application device in FIG. 1 according to various embodiments of the present disclosure.

FIG. 6 illustrates a zooming operation performed on the makeup application device in FIG. 1 according to various embodiments of the present disclosure. In the example shown, the user interface shown on the makeup application device 102 includes a control for allowing the makeup professional to zoom in and facilitate the virtual application of cosmetic effects. For some embodiments, the makeup professional can control whether the user of the client device 122 views the digital image at the zoom level specified by the makeup professional. In the example shown, another control on the user interface viewed by the makeup professional allows the makeup professional to specify whether the display of the client device 122 similarly zooms in to the digital image of the user when the makeup professional zooms in to view the 3D model. In some embodiments, the user of the client device 122 can zoom in and out (independent of the zoom level utilized by the makeup professional on the makeup application device 102) while viewing application of the virtual cosmetic effects by the makeup professional.

Figure 7:
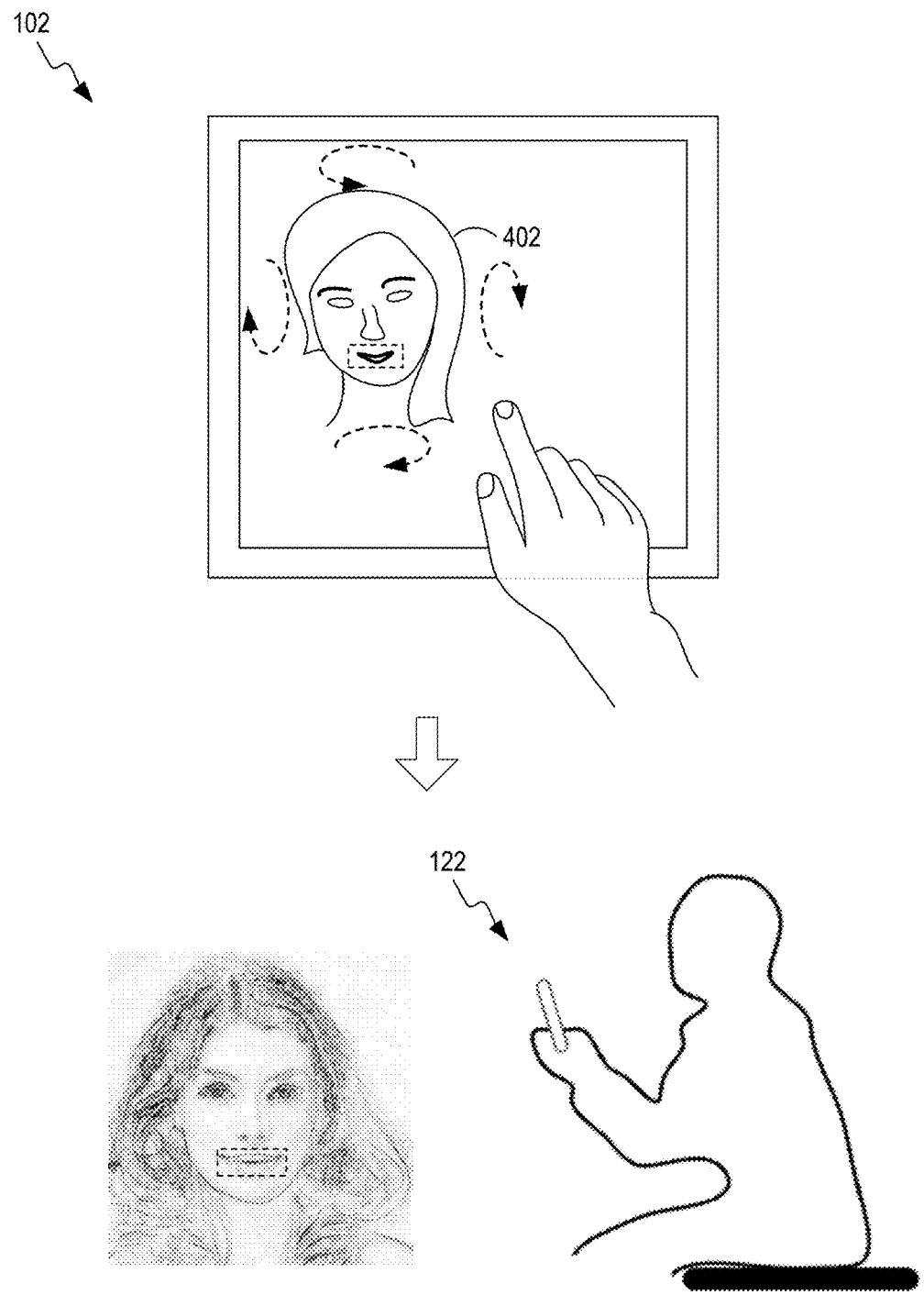
FIG. 7 illustrates adjustment to an orientation of the 3D facial model along one or more axes performed on the makeup application device in FIG. 1 according to various embodiments of the present disclosure.

FIG. 7 illustrates adjustment to an orientation of the 3D facial model along one or more axes performed on the makeup application device in FIG. 1 according to various embodiments of the present disclosure. In the example shown, the makeup professional adjusts the orientation of the 3D facial model along one or more axes to facilitate the virtual application of cosmetic effects. For example, the makeup professional may utilize a user interface displayed on the makeup application device 102 to perform rotating and panning operations on the 3D facial model for purposes of applying virtual cosmetic effects. Virtual application of a cosmetic effect on the 3D model causes a corresponding command to be generated and transmitted via the network 120 to the client device 122. The command causes the client device 122 to display virtual application of the same cosmetic effect onto a digital image of the user of the client device 122. The makeup professional may also allow the user to view the current adjusted orientation utilized by the makeup professional while applying the makeup effect.

Figure 8:
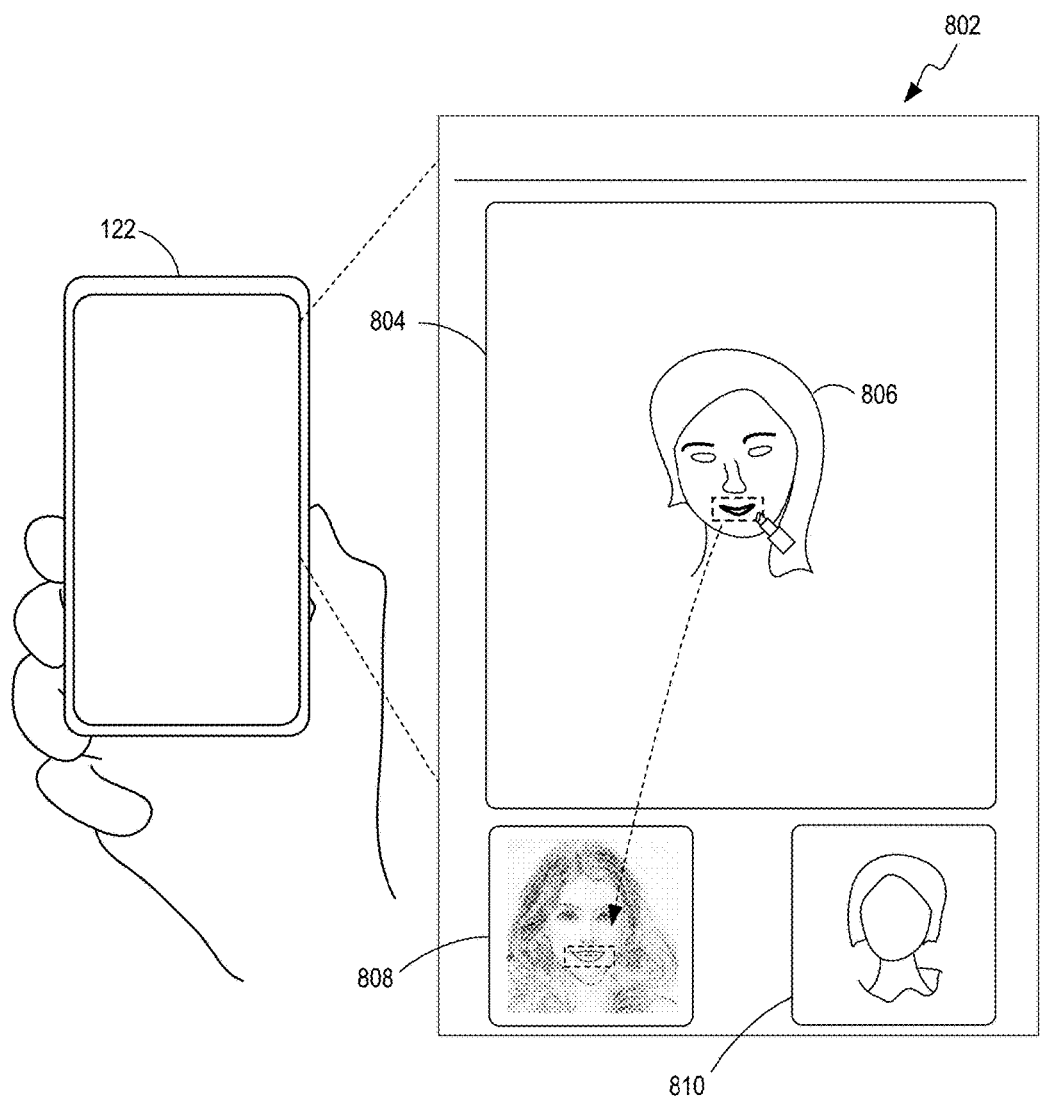
FIG. 8 illustrates another example user interface provided on a display of a client device in FIG. 1 according to various embodiments of the present disclosure.

FIG. 8 illustrates another example user interface 802 provided on a display of a client device 122 in FIG. 1 according to various embodiments of the present disclosure. In the example shown, a lipstick effect is applied by the makeup professional to a 3D model 806 of the user. The user of the client device 122 views application of the lipstick effect onto the 3D model 306 by the makeup professional in a first viewing window 804. This causes a corresponding lipstick effect to be applied to a digital image of the user. In some implementations, a live video feed of the user is displayed in a second viewing window 808 on the client device 122 while makeup effects are applied by the makeup professional, thereby providing a virtual mirror effect.

The user interface 802 may also include a third viewing window 810 that shows a live video feed of the makeup professional. Notably, the user is able to simultaneously view images of the makeup professional, the 3D model 806, and the user where application of virtual cosmetic effects is shown in real time to both the 3D model and to the digital image of the user. A similar user interface may be provided to the makeup professional on the makeup application device 102. In other implementations, a picture-in-picture (PIP) configuration may be utilized where the first viewing window 804 encompasses the full display area while the second viewing window 808 and the third viewing window 810 are shown as inset windows on top of the first viewing window 804.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:
1. A method implemented in a makeup application device utilized by a makeup professional, comprising:
   obtaining a makeup consultation request from a user of a client device;
   obtaining at least one digital image of a facial region of the user from the client device;
   generating a three-dimensional (3D) facial model based on the at least one digital image;
   obtaining user input from the makeup professional for applying virtual cosmetic effects to the 3D facial model;
   generating a makeup command based on the user input from the makeup professional for applying a virtual cosmetic effect, wherein the makeup command causes the client device to apply the virtual cosmetic effect to the at least one digital image, and display the virtual cosmetic effect on the client device;
   obtaining an enable input command from the makeup professional specifying whether to allow the client device to adjust one or more of: the zoom level, the degree of rotation, or the degree of panning of the 3D facial model;

transmitting the makeup command to the client device, the makeup command causing a virtual cosmetic effect to be applied to the at least one digital image of the facial region of the user and displaying the at least one digital image; and responsive to receiving the enable input command from the makeup professional specifying that the client device is allowed to perform adjustments, receiving user input from the client device to adjust one or more of: the zoom level, the degree of rotation, or the degree of panning of the 3D facial model.

2. The method of claim 1, wherein displaying the at least one digital image comprises displaying a live video feed of the facial region of the user.

3. The method of claim 1, wherein obtaining user input from the makeup professional for applying virtual cosmetic effects to the 3D facial model comprises:

obtaining an adjustment to an orientation of the 3D facial model along one or more axes from the makeup professional and displaying the 3D facial model according to the adjusted orientation; and obtaining a location on the 3D facial model and applying a cosmetic effect to the location on the 3D facial model.

4. The method of claim 3, wherein the makeup command causes the client device to display application of the virtual cosmetic effect to the at least one digital image of the facial region of the user according to the adjusted orientation obtained from the makeup professional.

5. The method of claim 1, wherein the step of transmitting the makeup command to the client device is performed whenever user input is obtained from the makeup professional, wherein the makeup command comprises locations of feature points where the virtual cosmetic effects are applied to the 3D facial model, wherein the client device maps the feature points where the virtual cosmetic effects are applied to the 3D facial model to feature points on the facial region of the user, and wherein the client device applies the same virtual cosmetic effects to the facial region of the user based on the mapped feature points.

6. The method of claim 1, wherein obtaining the at least one digital image of the facial region of the user from the client device comprises causing the client device to prompt the user to face a front facing camera of the client device at a plurality of angles and capturing a digital image at each angle.

7. The method of claim 1, wherein generating the 3D facial model based on the at least one digital image comprises:

retrieving a default 3D model; and modifying a size and location for predetermined facial features on the default 3D model based on a size and location of corresponding facial features on the at least one digital image of the facial region of the user.

8. The method of claim 1, further comprising storing a sequence in which the user input is obtained from the makeup professional for applying virtual cosmetic effects to the 3D facial model.

9. A system, comprising:
a memory storing instructions;
a processor coupled to the memory and configured by the instructions to at least:
obtain a makeup consultation request from a user of a client device;
obtain at least one digital image of a facial region of the user from the client device;
generate a three-dimensional (3D) facial model based on the at least one digital image;
obtain user input from a makeup professional for applying virtual cosmetic effects to the 3D facial model;
generate a makeup command based on the user input from the makeup professional for applying a virtual cosmetic effect, wherein the makeup command causes the client device to apply the virtual cosmetic effect to the at least one digital image, and display the virtual cosmetic effect on the client device;
obtaining an enable input command from the makeup professional specifying whether to allow the client device to adjust one or more of: the zoom level, the degree of rotation, or the degree of panning of the 3D facial model;
transmit the makeup command to the client device, the command causing a virtual cosmetic effect to be applied to the at least one digital image of the facial region of the user and displaying the at least one digital image; and
responsive to receiving the enable input command from the makeup professional specifying that the client device is allowed to perform adjustments, receiving user input from the client device to adjust one or more of: the zoom level, the degree of rotation, or the degree of panning of the 3D facial model.

10. The system of claim 9, wherein the processor obtains user input from the makeup professional for applying virtual cosmetic effects to the 3D facial model by obtaining an adjustment to an orientation of the 3D facial model along one or more axes from the makeup professional and displaying the 3D facial model according to the adjusted orientation; and obtaining a location on the 3D facial model and applying a cosmetic effect to the location on the 3D facial model.

11. The system of claim 9, wherein the processor transmits the makeup command to the client device whenever user input is obtained from the makeup professional, wherein the makeup command comprises locations of feature points where the virtual cosmetic effects are applied to the 3D facial model, wherein the client device maps the feature points where the virtual cosmetic effects are applied to the 3D facial model to feature points on the facial region of the user, and wherein the client device applies the same virtual cosmetic effects to the facial region of the user based on the mapped feature points.

12. The system of claim 9, wherein the processor obtains the at least one digital image of the facial region of the user from the client device by causing the client device to prompt the user to face a front facing camera of the client device at a plurality of angles and capturing a digital image at each angle.

13. A non-transitory computer-readable storage medium storing instructions to be implemented by a computing device having a processor, wherein the instructions, when executed by the processor, cause the computing device to at least:
obtain a makeup consultation request from a user of a client device;
obtain at least one digital image of a facial region of the user from the client device;
generate a three-dimensional (3D) facial model based on the at least one digital image;

obtain user input from a makeup professional for applying virtual cosmetic effects to the 3D facial model;

generate a makeup command based on the user input from the makeup professional for applying a virtual cosmetic effect, wherein the makeup command causes the client device to apply the virtual cosmetic effect to the at least one digital image, and display the virtual cosmetic effect on the client device;

obtaining an enable input command from the makeup professional specifying whether to allow the client device to adjust one or more of: the zoom level, the degree of rotation, or the degree of panning of the 3D facial model;

transmit the command to the client device, the command causing a virtual cosmetic effect to be applied to the at least one digital image of the facial region of the user and displaying the at least one digital image; and responsive to receiving the enable input command from the makeup professional specifying that the client device is allowed to perform adjustments, receiving user input from the client device to adjust one or more of: the zoom level, the degree of rotation, or the degree of panning of the 3D facial model.

14. The non-transitory computer-readable storage medium of claim 13, wherein the processor obtains user input from the makeup professional for applying virtual cosmetic effects to the 3D facial model by obtaining an adjustment to an orientation of the 3D facial model along one or more axes from the makeup professional and displaying the 3D facial model according to the adjusted orientation; and obtaining a location on the 3D facial model and applying a cosmetic effect to the location on the 3D facial model.

* * * * *